(12) United States Patent
Sui

(10) Patent No.: US 11,942,835 B2
(45) Date of Patent: Mar. 26, 2024

(54) WIRELESS DIGITAL REMOTE CONTROL INVERTER OF AC MOTOR

(71) Applicant: Cheng-Chung Sui, Taichung (TW)

(72) Inventor: Cheng-Chung Sui, Taichung (TW)

( * ) Notice: Subject to any disclaimer, the term of this patent is extended or adjusted under 35 U.S.C. 154(b) by 498 days.

(21) Appl. No.: 16/990,919

(22) Filed: Aug. 11, 2020

(65) Prior Publication Data

US 2021/0067012 A1   Mar. 4, 2021

(30) Foreign Application Priority Data

Aug. 30, 2019   (TW) .................. 108211536

(51) Int. Cl.
| | |
|---|---|
| *H02K 11/35* | (2016.01) |
| *G08C 17/02* | (2006.01) |
| *H02P 27/06* | (2006.01) |

(52) U.S. Cl.
CPC ............ *H02K 11/35* (2016.01); *G08C 17/02* (2013.01); *H02P 27/06* (2013.01)

(58) Field of Classification Search
CPC .... H02K 11/35; H02K 2213/09; G08C 17/02; H02P 27/06; H02P 27/04; H04B 13/00; H02J 7/02; H02M 7/44; F24D 19/10; F24D 13/00
See application file for complete search history.

(56) References Cited

U.S. PATENT DOCUMENTS

| | | | | |
|---|---|---|---|---|
| 4,194,182 | A * | 3/1980 | Martin | H02J 13/00009 340/309.9 |
| 10,312,823 | B1 * | 6/2019 | Montgomery | H02M 7/44 |
| 2012/0212883 | A1 * | 8/2012 | Hargreaves | H05K 5/0017 361/679.01 |
| 2016/0170381 | A1 * | 6/2016 | Mininger | G04G 13/026 368/10 |

FOREIGN PATENT DOCUMENTS

CN   208108038 U * 11/2018

OTHER PUBLICATIONS

CN-208108038-U machine translation on Apr. 22, 2023.*

* cited by examiner

*Primary Examiner* — Leda T Pham
(74) *Attorney, Agent, or Firm* — Cheng-Ju Chiang

(57) ABSTRACT

This invention discloses a wireless digital remote control inverter of AC motor. The wireless digital remote control inverter of AC motor comprises a control circuit module. The control circuit module includes a controller as a main processor and is connected to the wireless transmission module. Users can use the wireless transmission module which comprises multiple wireless communication protocols and the handheld device for information transmission, operation monitoring and control to achieve the purpose of wireless remote control of the wireless digital remote control AC motor inverter.

5 Claims, 2 Drawing Sheets

WIRELESS DIGITAL REMOTE CONTROL INVERTER OF AC MOTOR

TECHNICAL FIELD

The present disclosure relates to the field of frequency conversion control of AC motor. Specifically, this invention is about a wireless digital remote control inverter of AC motor thereby using the wireless transmission technology such as Bluetooth™ to remote AC motor wirelessly.

The rotational speed of the traditional AC motor is controlled by the frequency of AC power source. For example, the frequency of AC powers supply system used to be set approximately at 60 Hz in Taiwan. When a power that outputs single-phase two-wire system alternating current power and the number of poles of one-way AC motor is $2^n$, the desired rotational speed of AC motor is 3,600 r.p.m.

However, when using a power that the number of poles of one-way AC motor is 4', the desired rotational speed of AC motor is 1,800 r.p.m. Although these theories are well-known, a real rotational speed of the AC motor depends on the load which it has to drive. Hence, at a heavy load condition, the rotational speed of the AC motor may fail to maintain the ideal rotational speed in whole operating time and then decrease. On the other hand, the internal circuit and the connection mode of the AC motor are needs to be changed when the power differs from third-phase three-wire system or fourth-phase four-wire system, therefore to adapt different power supply modes.

However, if the frequency of electric power remains stable in 60 Hz, the motor rotational speed of some AC motors cannot be changed by some simple methods easily. The rotational directions (clockwise or anticlockwise rotation) of some AC motors can only be switched by changing the internal wire connections per se. In fact, the rotational directions and speeds of traditional AC motors cannot be alternated just by changing the power supply voltage but internal wire connections, thus the rotational directions and speeds of traditional AC motors cannot be change in a simple way.

At the present time, the abovementioned problems are able to be solved through the inverter design. On the other hand, the inverter also needs to be redesigned while the power system design is changing. The conventional inverter may be designed to be a single-phase input/three-phase output mode, a single-phase input/single-phase output mode and the other input/output mode, depending on various different needs of users.

When a AC motor is connected to the AC power via the inverter, mostly, the AC power is inputted and switched by the PWM (Pulse Width Modulation). Thus the input power of AC motor can be changed through the internal program provided by the controller of inverter for regulating the voltage and the frequency outputted by the power supplier.

The abovementioned principle makes the controlling of rotational direction and speed of present AC motor without reconnecting the internal wire per se possible. However, there is no intuitive system on the market today that gives a convenient way to control AC motor more efficiently, when the crux of the control factor is human.

SUMMARY

The above summary of the present disclosure is to provide a basic description of the various aspects and features of the present disclosure. It is not a detailed description. Its purpose is not to specifically recite keys or critical elements of the present disclosure, and it is not intended to limit the scope of the present disclosure. It merely presents a few concepts of the present disclosure in a concise manner.

This invention discloses a wireless digital remote control inverter of AC motor includes a casing, a control circuit module, a power input hole, a power switch, a display apparatus, a rotation rate adjusting element, and a power hole.

The control circuit module is provided in the casing. The power input hole, the power switch, the display apparatus, the rotation rate adjusting element, and the power hole are disposed on the casing.

According to the concepts disclosed above, the wireless digital remote control inverter of AC motor can be remotely controlled via any application software of portable devices. Such that the structure is provided to allow a user to operate and monitor the AC motor directly, even in real-time. In additional to using the structure, the portable device may also be added more programs of the user's requirement, e.g., the user enters in the passcode prior to operating the interface of portable device, preventing from erroneously adjusting the operation of the AC motor.

The above summary of the present disclosure relates to provide a basic description of the various aspects and features of the invention. The invention is not to be construed as being limited to the details of the present disclosure.

DESCRIPTION OF THE PREFERRED EMBODIMENTS

To clarify the purpose, technical solutions, and the advantages of the disclosure, embodiments of the present disclosure will now be described more fully hereinafter with reference to the accompanying drawings.

The technology develops rapidly and the portable devices such as mobile phones or tablets are quiet commonly be seen and used in our life. In order to the commercial wireless transmission technology (e.g. Bluetooth™) developed well, everyone having his/her own portable device(s) with wireless transmission function becomes more common and normal nowadays.

Bluetooth™ technology allows transmitting data or voice signals ranged from acceptable frequency. Furthermore, electronic device with Bluetooth™ technology have a certain and unique address. The users can wirelessly transfer or receive messages or data in configurations of one-to-one or one-to-many via low-power radio waves. The technology is typically employed for exchanged communications between fixed or mobile Bluetooth-enabled devices over short distance, e.g., the signal transmission range between 10 meters to 100 meters, and may also encrypt the message using an encoding system.

The present disclosure that wirelessly communication with the AC motor using Bluetooth™ protocols to enable the wireless digital remote control inverter of AC motor 10 to be accomplished.

Figure 1:
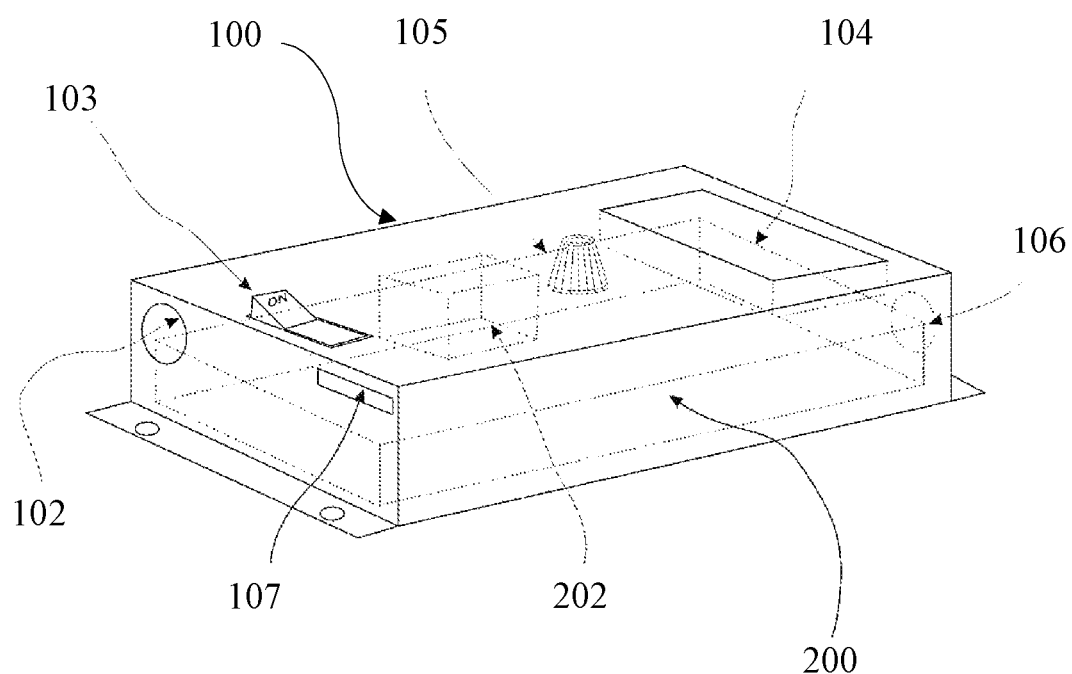
FIG. 1 is a schematic view showing the wireless digital remote control inverter of AC motor in accordance with one embodiment of the present disclosure.
Figure 2:
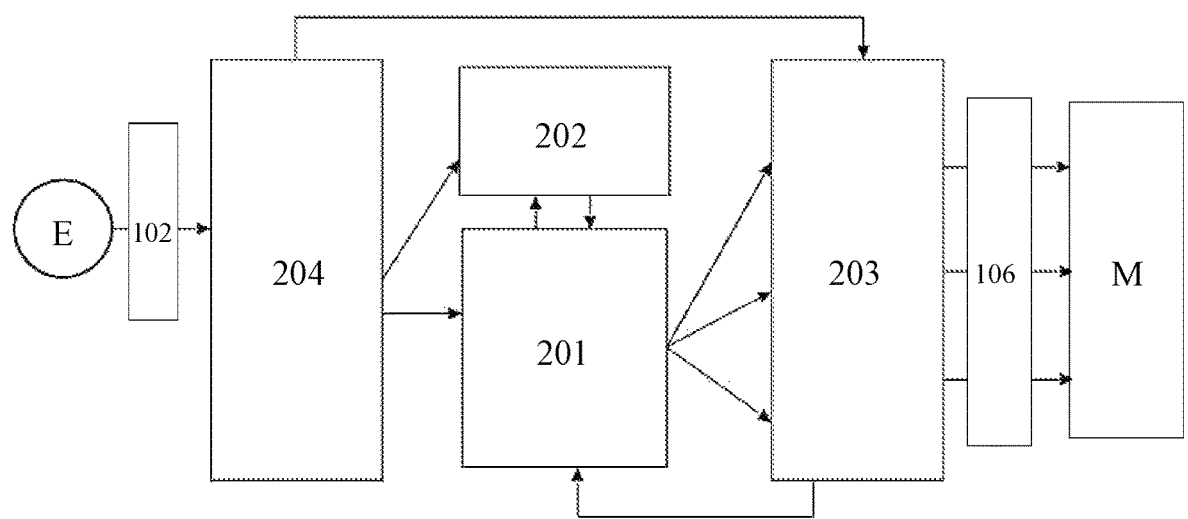
FIG. 2 is block diagram of the control circuit module in accordance with one embodiment of the present disclosure.

Please see FIG. 1-FIG. 2. FIG. 1 is a schematic view showing the wireless digital remote control inverter of AC motor 10 in accordance with one embodiment of the present disclosure. FIG. 2 is block diagram of the control circuit module in accordance with one embodiment of the present disclosure. As shown in FIG. 1, the wireless digital remote control inverter of AC motor 10 includes a casing 100, a control circuit module 200, a power input hole 102, a power switch 103, a display apparatus 104, a rotation rate adjusting element 105, and a power hole 106.

The control circuit module 200 is provided in the casing 100. The power input hole 102, the power switch 103, the display apparatus 104, the rotation rate adjusting element 105, and the power hole 106 are disposed on the casing 100. Referring to FIGS. 1 and 2, the power input hole 102 connects to the inside of the control circuit module 200. As shown in FIG. 2, the control circuit module 200 may include a controller 201, a wireless transmission module 202, a battery protection module 203, and a receiving processing module 204.

Referring to FIGS. 1 and 2, the controller 201 in FIG. 2 associated with the display apparatus 104 while connecting to the rotation rate adjusting element 105 providing on the casing in FIG. 1. In this embodiment, the rotation rate adjusting element 105 is a resistance-controlled knob that the user can output the modulated commands to the controller 201 with intuition, so as to issue commands to the battery protection module 203. As a result, the battery protection module 203 is simultaneously connected with the power hole 106 and the controller 201.

In this embodiment, the casing 100 includes a control wire hole 107 and connecting with the controller 201. Therefore, this embodiment may be configured to provide control options of selecting a wire by the users.

The display apparatus 104 is implemented with liquid crystal display (LCD) or Organic light emitting diode display (OLED display). In the other possible embodiments, the display apparatus 104 can also be a device having the touch pad or the touch screen, e.g., the device included resistive touch screen or capacitive touch screen.

The wireless transmission module 202 connects to the controller 201. On the hand, the receiving processing module 204 is simultaneously connected with the power input hole 102, the power switch 103, the controller 201, the wireless transmission module 202, and the battery protection module 203. In the embodiment, the controller 201 is able to be implemented by a microcontroller (MCU).

Specifically, the microcontroller (MCU) means to the controller 201. Mainly consisted of an operation logic unit, a memory unit, and an input-output unit. The operation logic unit may receive and process with the information transmitted from the wireless transmission module 202, the battery protection module 203, the receiving processing module 204, or even the display apparatus 104 and the rotation rate adjusting element 105, thus to analyze the information via logical operations.

The memory unit supply stores the signal information of the controller 201, and the input-output unit which is matched or connected with the external interface (e.g., the wireless transmission module 202, the battery protection module 203, the receiving processing module 204, the display apparatus 104, and rotation rate adjusting element 105).

In current embodiment, the wireless transmission module 202 as described supra may be a Bluetooth™ device, transmitting data via wireless communication technologies that allows a user to command the controller 201 via the application software of the wireless transmission module 202 quickly.

In more detail, the abovementioned wireless transmission module 202 includes a receiving module and an emitter module. The receiving module further includes at least one receive antenna and at least one filter, for receiving outside wireless signals. The emitter module further includes at least one transmit antenna and at least one amplifier, for transmitting the wireless signals of the wireless digital remote control inverter of AC motor 10.

The wireless transmission module 202 supports different versions of Bluetooth™ protocol, e.g., Bluetooth 2.0, Bluetooth 3.0, Bluetooth 4.0 or Bluetooth 5.0; and the application software can be applied by writing in the Java language or Objective-C language, for supporting different operating systems (OS) (e.g., Android and APPLE iOS respectively). As a result, the wireless transmission module 202 is able to be directly connected or remotely controlled by the portable devices of the user. When the user downloads the application software as described supra to the portable device via an associated server system (e.g., Internet), further adjusting various control parameters of the wireless digital remote control inverter of AC motor 10, so as to modulate the operation parameters (e.g., rotating speed, direction, and opening-closing times etc.) of an AC motor M. In addition, various parameters of the wireless digital remote control inverter of AC motor 10 can be monitored in real-time via the wireless transmission module 202 outputting the parameter information to the portable device via the Bluetooth™ protocol.

In the present embodiment, the receiving processing module 204 further comprises a low-voltage direct current (DC) power source output module and a high-voltage direct current (DC) power source output module. The low-voltage direct current (DC) power source output module is connected to the controller 201 and wireless transmission module 202, and further connects to the battery protection module 203. On the other hand, the high-voltage direct current (DC) power source output module is connected to the battery protection module 203.

The reason why this embodiment uses low-voltage direct current (DC) power source output module and high-voltage direct current (DC) power source output module simultaneously is that the low-voltage direct current (DC) power source output module may turn a alternating current (AC) power source E into low-voltage direct current (DC) power source, supplying the wireless digital remote control inverter of AC motor 10, such as the controller 201 per se, the internal calculations between the controller 201 and the wireless transmission module 202, or the electrical controlling signals output from low-voltage circuit of the battery protection module 203.

Furthermore, the reason why the high-voltage direct current (DC) power source output module is connected with the battery protection module 203 is that the alternating current (AC) power source E can be transferred into the high-voltage direct current (DC) power source via the high-voltage direct current (DC) power source output module prior to be inputted into the battery protection module 203, such that the current parameters therein can be adjusted by receiving the signals from the controller 201, so as to change and supply the power source to the AC motor M then further controlling the ways of its operation, and hereinafter, the current parameters can be as the frequency of high-voltage power, or the phase of high-voltage power etc.

As a result, in this embodiment, the battery protection module 203 may be connected to the power hole 106. The power hole 106 further connects to the AC motor M, therefore to receiving control signals from the wireless digital remote control inverter of AC motor 10.

The above description is merely the embodiments in the present invention. The claim listed in this paper is not limited to the description thereby. The equivalent structure or changing of the process of the content of the description and the figures, or to implement to other technical fields directly or indirectly should be included in the claim. All other embodiments obtained by a person of ordinary skill in the art based on the embodiments of the present disclosure without creative efforts shall fall within the protection scope of the present disclosure.

What is claimed is:

1. A wireless digital remote control inverter of AC motor, comprising:
   a casing;
   a control circuit module disposed in the casing;
   a power input hole configured on the casing;
   a power switch configured on the casing;
   a display apparatus configured on the casing;
   a rotation rate adjusting element configured on the casing; and
   a power hole configured on the casing;
   wherein the rotation rate adjusting element is a resistance-controlled knob that makes
   a user output a modulated command to the control circuit module;
   wherein the control circuit module comprises:
   a controller connecting to both of the rotation rate adjusting element and the display apparatus;
   a wireless transmission module connecting to the controller;
   a battery protection module connecting to both of the power hole and the controller; and
   a receiving processing module simultaneously engaging with the power input hole, the power switch, the controller, the wireless transmission module, and the battery protection module;
   wherein the receiving processing module further comprises a low-voltage direct current power source output system and a high-voltage direct current power source output system, the low-voltage direct current power source output system connecting to both of the wireless transmission module and the battery protection module; the high-voltage direct current power source output system connected to the battery protection module;
   wherein the power hole further connects to an alternating current motor;
   wherein the wireless transmission module wirelessly connects to at least one portable device;
   wherein the wireless transmission module is directly connected or remotely controlled by the at least one portable device;
   wherein an application software of the at least one portable device adjusts control parameters of the wireless digital remote control inverter of the alternating current motor via internet;
   wherein the control parameters modulates operation parameters of the alternating current motor;
   wherein the operation parameters comprises rotating speed, direction, and opening-closing times.

2. The wireless digital remote control inverter of AC motor as claimed in claim 1, wherein the controller is a microcontroller.

3. The wireless digital remote control inverter of AC motor as claimed in claim 2, wherein the microcontroller further comprises an operation logic unit, a memory unit, and an input-output unit.

4. The wireless digital remote control inverter of AC motor as claimed in claim 1, wherein the wireless transmission module is a Bluetooth™ device.

5. The wireless digital remote control inverter of AC motor as claimed in claim 1, wherein the casing further has a control wire hole connecting to the controller.

\* \* \* \* \*